(12) United States Patent
Soechting et al.

(10) Patent No.: US 6,887,039 B2
(45) Date of Patent: May 3, 2005

(54) STATIONARY BLADE IN GAS TURBINE AND GAS TURBINE COMPRISING THE SAME

(75) Inventors: Friedrich Soechting, Miami, FL (US); Satoshi Hada, Takasago (JP); Masamitsu Kuwabara, Takasago (JP); Junichiro Masada, Takasago (JP); Yasuoki Tomita, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/191,448

(22) Filed: Jul. 10, 2002

(65) Prior Publication Data
US 2004/0009059 A1 Jan. 15, 2004

(51) Int. Cl.⁷ .................................. F01D 11/00
(52) U.S. Cl. ..................... 415/174.4; 415/178
(58) Field of Search ................ 415/115, 116, 415/170.1, 174.4, 174.5, 175, 177, 178, 180, 191, 208.2

(56) References Cited

U.S. PATENT DOCUMENTS 5,215,435 A * 6/1993 Webb et al. ............. 415/173.7
5,217,348 A 6/1993 Rup, Jr. et al.
5,429,478 A 7/1995 Krizan et al.
6,152,690 A * 11/2000 Tomita et al. ........... 415/173.7

FOREIGN PATENT DOCUMENTS

EP 0 926 314 6/1999
JP 10-238308 9/1998

* cited by examiner

Primary Examiner—Edward K. Look
Assistant Examiner—Richard A Edgar
(74) Attorney, Agent, or Firm—Oblon, Spivak, McClelland, Maier & Neustadt, P.C.

(57) ABSTRACT

A stationary blade of a gas turbine, which can reduce thermal stress produced at a portion in the vicinity of a rear edge of an inner shroud of the stationary blade. The stationary blade is positioned adjacent to at least one of moving-blade disks in an axial direction of the gas turbine. A concave portion is provided in the inner shroud in a manner such that the concave portion is formed in the vicinity of a rear edge of the inner shroud and on an inner-peripheral face of the inner shroud, where cooling air passes along the inner-peripheral face which faces a rotation shaft of the moving-blade disks; and a protruding portion which protrudes towards the rotation shaft is formed at the rear edge of the inner shroud.

5 Claims, 5 Drawing Sheets

STATIONARY BLADE IN GAS TURBINE AND GAS TURBINE COMPRISING THE SAME

BACKGROUND OF THE INVENTION

1. Field of the Invention

The present invention relates to a stationary blade (or stator blade) provided in gas turbines and a gas turbine comprising the same.

2. Description of the Related Art

As shown in FIG. 4, a gas turbine 10 has the following major constituents: (i) a compressor (not shown) for compressing air for combustion and supplying the compressed air to a combustor 20, (ii) the combustor 20 for injecting fuel into the air supplied from the compressor so as to burn the air and produce high-temperature combustion gas G, and (iii) a turbine portion 30 which is positioned at the downstream side of the combustor 20 and is driven by the combustion gas G transferred from the combustor 20.

As a typical example, the turbine portion 30 has a first-row stationary blade 31, a first-row moving blade (or rotor blade) 32, a second-row stationary blade 33, a second-row moving blade 34, a third-row stationary blade 35, a third-row moving blade 36, a fourth-row stationary blade 37, and a fourth-row moving blade 38.

The first-row stationary blade 31 has an outer shroud 31a, a main body 31b whose cross-section has a wing-section shape, and an inner shroud 31c. The first-row stationary blade 31 is fastened in a chamber (not shown) at the stator side via the outer shroud 31a. Similarly, the second-row stationary blade 33 has an outer shroud 33a, a main body 33b whose cross-section also has a wing-section shape, and an inner shroud 33c. The second-row stationary blade 33 is fastened in the chamber at the stator side via the outer shroud 33a. Also similarly, the third-row stationary blade 35 has an outer shroud 35a, a main body 35b whose cross-section also has a wing-section shape, and an inner shroud 35c. The third-row stationary blade 35 is fastened in the chamber at the stator side via the outer shroud 35a. Also similarly, the fourth-row stationary blade 37 has an outer shroud 37a, a main body 37b whose cross-section also has a wing-section shape, and an inner shroud 37c. The fourth-row stationary blade 37 is fastened in the chamber at the stator side via the outer shroud 37a.

These first-, second-, third-, and fourth-row stationary blades are provided for expanding and decompressing the combustion gas G and directing the gas blown from the stationary blades so that the gas can collide with the moving blades 32, 34, 36, and 38 (which are positioned at the downstream side) at an optimum angle.

The first, second, third, and fourth moving blades 32, 34, 36, and 38 respectively have main bodies 32b, 34b, 36b, and 38b, and platforms 32d, 34d, 36d, and 38d are respectively attached to the base ends of these main bodies 32b, 34b, 36b, and 38b. The moving blades 32, 34, 36, and 38 are respectively attached via these platforms to moving blade disks 32e, 34e, 36e, and 38e.

The flow of the combustion gas G will be explained below. The combustion gas G, which has a high temperature due to the combustion in the combustor 20, is drawn from the first-row stationary blade 31 and expands while flowing through the second to fourth stationary blades, thereby rotating the moving blades 32, 34, 36, and 38 and providing rotational power to a turbine rotor. The combustion gas G is then discharged.

FIG. 5 is an enlarged view of the portion surrounded by circle A' in FIG.4. In FIG. 5, a heat insulating material 39, which may be a honeycomb seal made of porous ceramic, is provided at a rear-edge vicinity portion 33f of the inner shroud 33c (i.e., a portion in the vicinity of the rear edge of the inner shroud 33c) and on an inner-peripheral face 33g along which cooling air C passes and which faces a rotation shaft R (see FIG. 4) of the moving blade disks.

However, in this structure having the heat insulating material 39 at the rear-edge vicinity portion 33f of the inner shroud 33c, the inner-peripheral face 33g does not thermally communicate with the cooling air C; thus, heat of the rear-edge vicinity portion 33f of the inner shroud 33c is not sufficiently removed by the cooling air C, thereby producing thermal stress at this portion.

SUMMARY OF THE INVENTION

In consideration of the above circumstances, an object of the present invention is to provide a stationary blade for gas turbines, which can reduce thermal stress produced at a rear-edge vicinity portion of an inner shroud, and to provide a gas turbine comprising such a stationary blade.

Therefore, the present invention provides a stationary blade provided in a gas turbine which comprises moving blades arranged in a plurality of rows and moving-blade disks to which main bodies of the moving blades are attached, wherein:

the stationary blade comprises an outer shroud, a main body, and an inner shroud and is positioned adjacent to at least one of the moving-blade disks in an axial direction of the gas turbine;

the stationary blade introduces a combustion gas into the main body of the moving blade of the next row; and a concave portion is provided in the inner shroud in a manner such that:

the concave portion is formed in the vicinity of a rear edge of the inner shroud and on an inner-peripheral face of the inner shroud, where cooling air passes along the inner-peripheral face which faces a rotation shaft of the moving-blade disks; and a protruding portion which protrudes towards the rotation shaft is formed at the rear edge of the inner shroud.

That is, the concave portion is formed on the inner-peripheral face of the inner shroud while the protruding portion remains at the rear edge of the inner shroud. Therefore, the thickness of the inner shroud in the vicinity of the rear edge is reduced and the cooling air passes through the concave portion. Therefore, it is possible to reduce the thermal stress produced at this portion.

As a typical example, the concave portion has side walls which are continuously formed through the inner-peripheral face in a manner such that the side walls are substantially parallel to a plane of rotation of the moving-blade disks. Therefore, the thickness of the inner shroud in the vicinity of the rear edge is reduced through the inner-peripheral face and the cooling air passes through the concave portion. Accordingly, it is possible to further reduce the thermal stress produced at this portion.

Additionally, a plurality of fins for radiating heat may be arranged on a bottom face of the concave portion, which protrude towards the rotation shaft of the moving-blade disks. The heat radiation efficiency can be further improved according to these fins and it is possible to further reduce the thermal stress produced at the concave portion.

Preferably, the fins are arranged along a direction which is inclined with respect to the rotation shaft of the moving-blade disks and by which a flow of the cooling air is disturbed. Accordingly, the cooling air collides with the fins and can remove thermal boundary layers which have been formed above the fins, thereby further reducing the thermal stress produced at the concave portion.

In addition, a heat insulating material may be attached to a part of the inner-peripheral face, the part being positioned between the concave portion and the rear edge of the inner shroud. According to such a heat insulating material, the gap between this part and a member (such as a platform) of one of the moving blades which faces the part can be narrowed. Therefore, it is possible to suppress or reduce the flow of the cooling air which passes between the inner shroud of the stationary blade (in the vicinity of the rear edge) and a platform or the like of one of the moving blades and flows to main bodies of the stationary and moving blades.

As a preferable example, a length of the heat insulating material in the axial direction of the gas turbine (e.g., 10 mm in an embodiment explained below) is determined based on a difference due to thermal expansion of a member (e.g., a platform 34d (more specifically, an arm 34f) in the embodiment explained below) which is attached to one of the moving blades and which faces the protruding portion. Accordingly, the area where the heat insulating material is provided can be minimized and the area where the concave portion is formed can be maximized, thereby further reducing the thermal stress produced at the concave portion.

The present invention also provides a gas turbine comprising:

a turbine portion having a stationary blade as explained above;

a compressor for compressing air for combustion and supplying the compressed air to a combustor; and the combustor for burning the air supplied from the compressor by injecting fuel into the air and for producing a high-temperature combustion gas.

That is, this gas turbine has a stationary blade which has a concave portion as explained above; thus, thickness of this portion is reduced and the cooling air passes through the this portion. Therefore, it is possible to reduce the thermal stress produced at this portion.

DESCRIPTION OF THE PREFERRED EMBODIMENTS

Hereinafter, an embodiment according to the present invention will be explained with reference to the drawings. The major constituents of the gas turbine 10 (refer to FIG. 4) and the structure of the turbine portion 30 are the same as those as explained above; thus, explanations thereof are omitted and only distinctive features of the present embodiment will be explained here. In addition, parts identical to those in the above-explained figures are given identical reference symbols.

Figure 1:
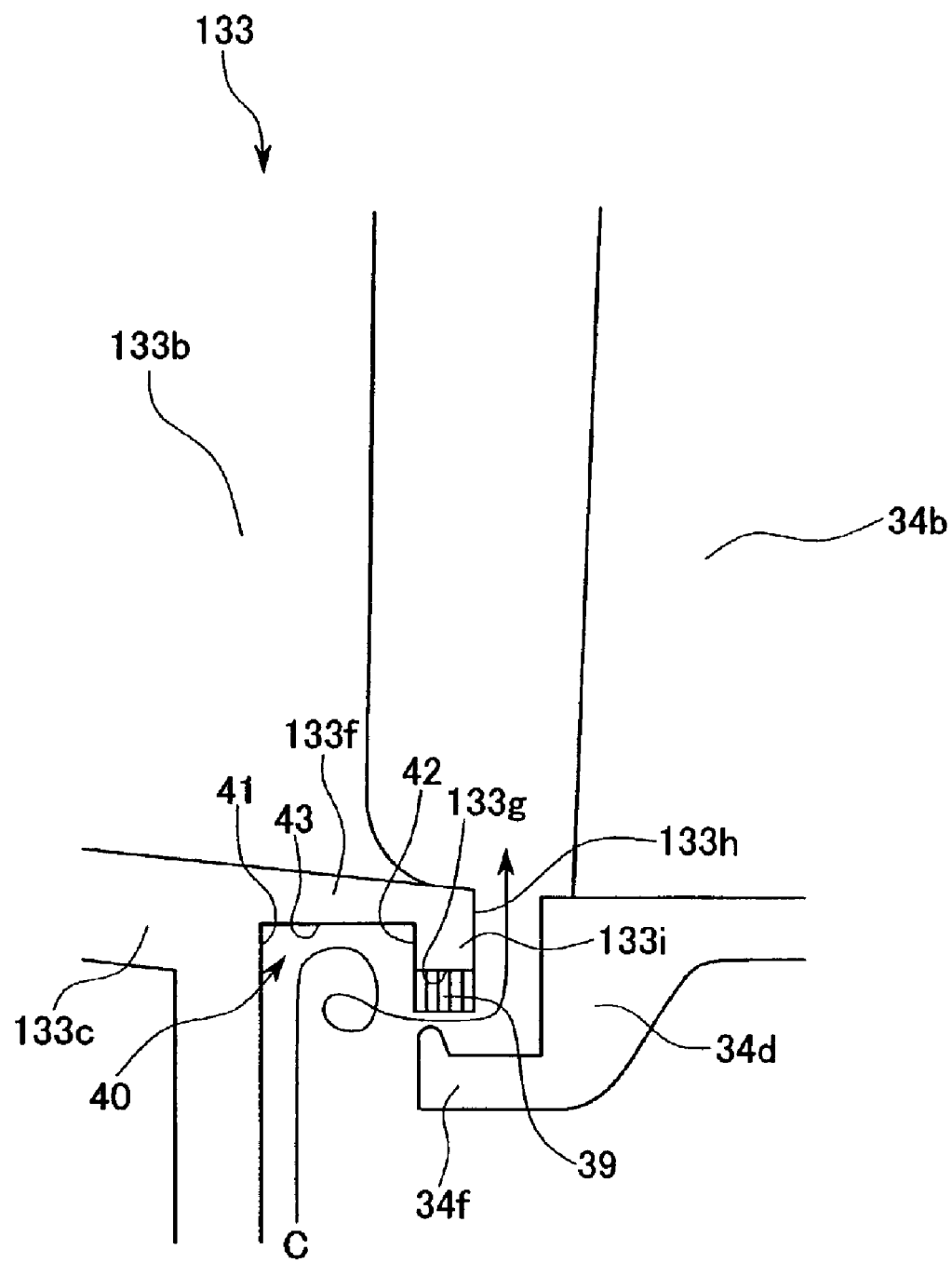
FIG. 1 is a diagram which shows an embodiment of a stationary blade of a gas turbine according to the present invention and which is a partially enlarged view showing a distinctive portion of the stationary blade.
Figure 5:
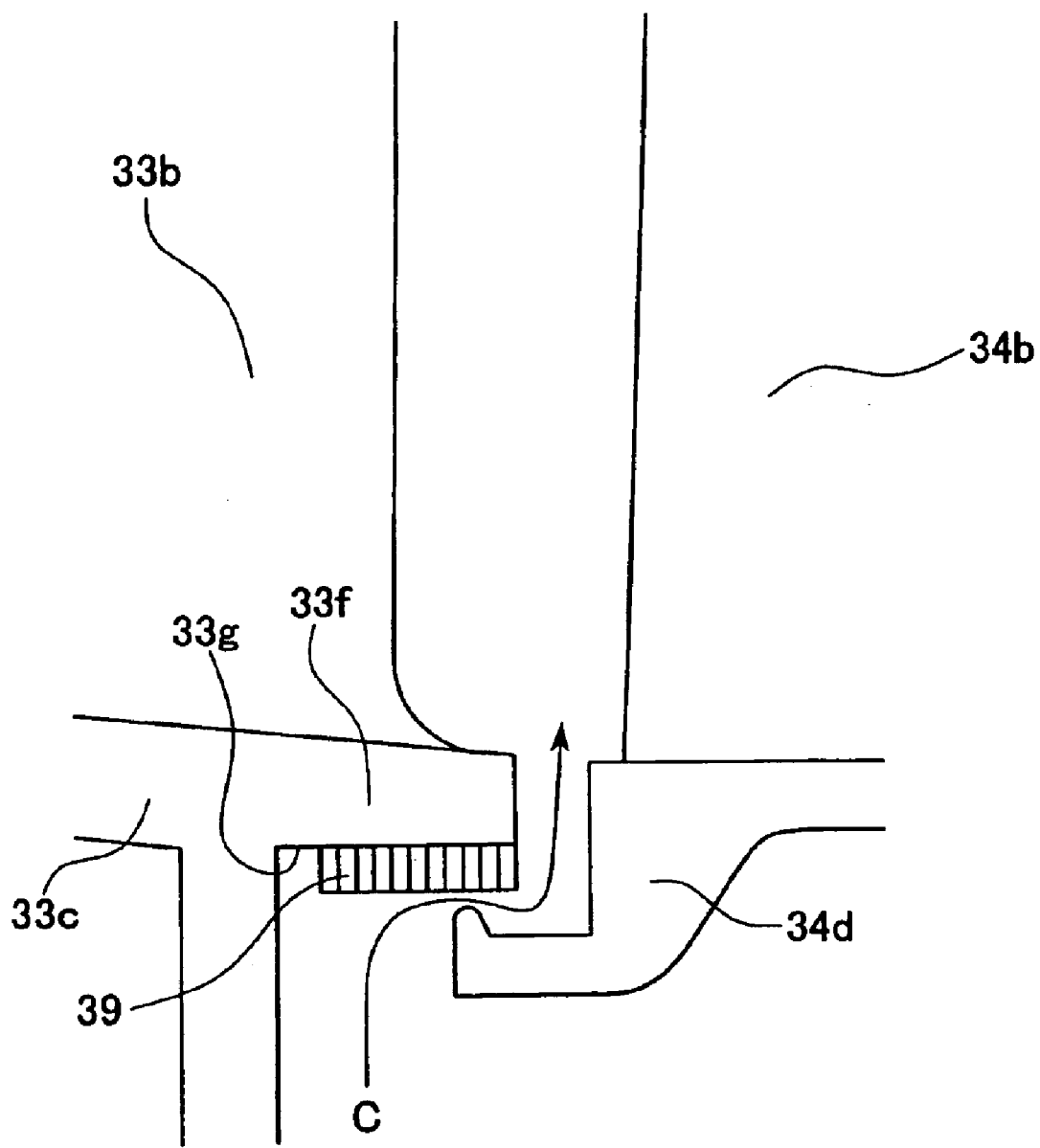
FIG. 5 is a partially enlarged view of the portion surrounded by circle A' in FIG. 4.

FIG. 1, which corresponds to FIG. 5, is a partially enlarged view of a (second-row) stationary blade 133 of the gas turbine 10, and the view shows a rear-edge vicinity portion 133f of an inner shroud 133c (i.e., a portion in the vicinity of a rear edge 133h of the inner shroud 133c) of the stationary blade 133.

As shown in FIG. 1, a concave portion 40 is provided at the rear-edge vicinity portion 133f of the inner shroud 133c and on an inner-peripheral face 133g along which cooling air C passes and which faces the rotation shaft R (see FIG. 4) of the moving blade disks, where the concave portion 40 is concave in the radial direction and is provided so as to form (or remain) a protruding portion 133i at the rear edge 133h, which protrudes towards the rotation shaft R.

In this structure, side walls 41 and 42 of this concave portion 40 are continuously formed through the inner-peripheral face 133g in a manner such that these side walls are substantially parallel to the plane of rotation of the moving-blade disks (i.e., a plane perpendicular to the rotation shaft R of the moving-blade disks).

That is, in FIG. 1, the bottom face 43 of the concave portion 40 is formed in an upper position in comparison with the inner-peripheral face 133g, thereby producing a thinner thickness of the rear-edge vicinity portion 133f. Therefore, this portion 133f is efficiently cooled by the cooling air C, and the thermal stress produced at this portion can be reduced.

The depth of the concave portion 40 and the distance between the side walls 41 and 42 are suitably determined in order to sufficiently reduce the thermal stress produced at the rear-edge vicinity portion 133f.

Figure 4:
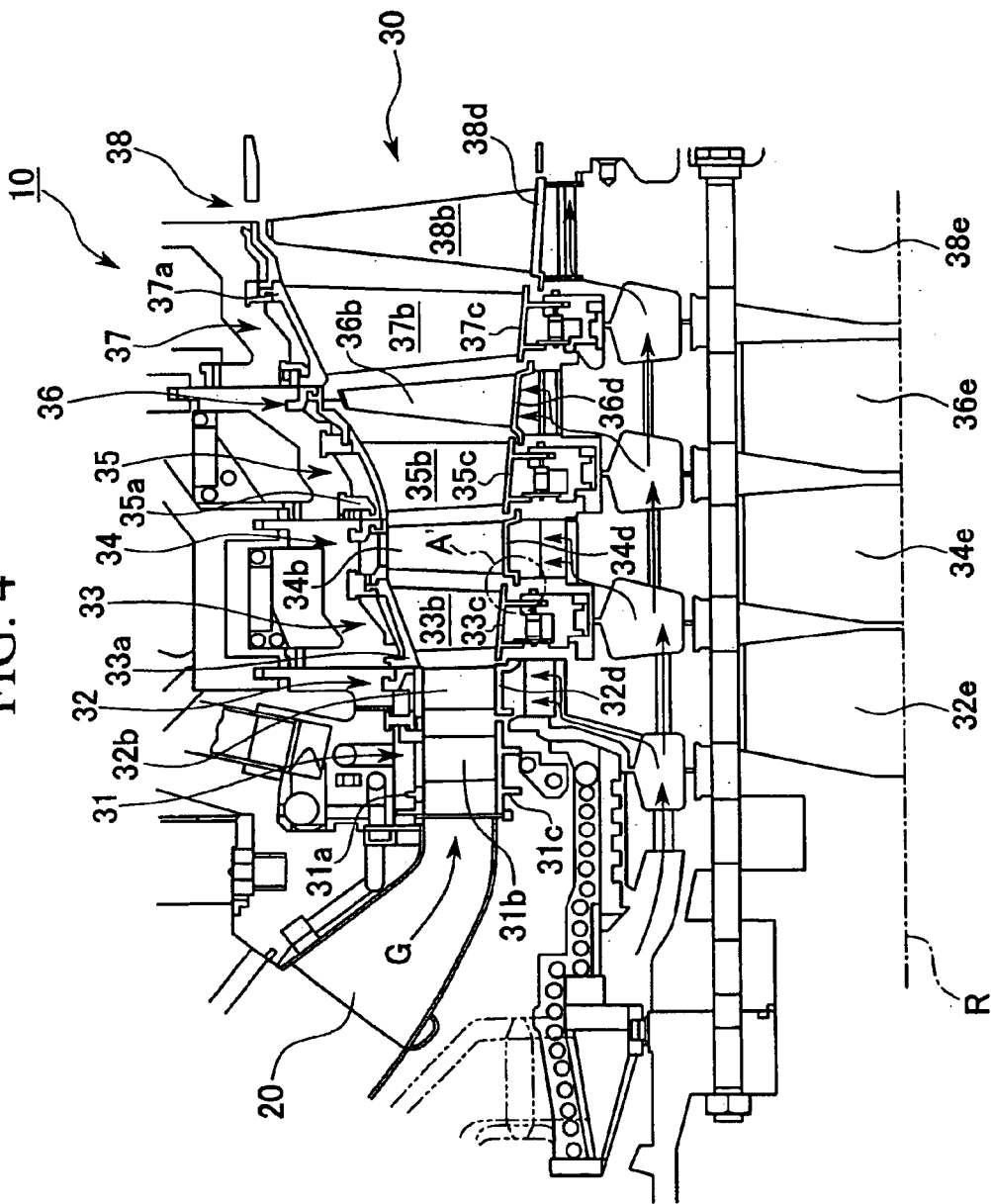
FIG. 4 is a sectional view of a turbine portion of a conventional gas turbine.

Here, the cooling air C moves at a speed approximately half the peripheral speed of the moving-blade disks 32e, 34e, 36e, and 38e (see FIG. 4).

Figure 2:
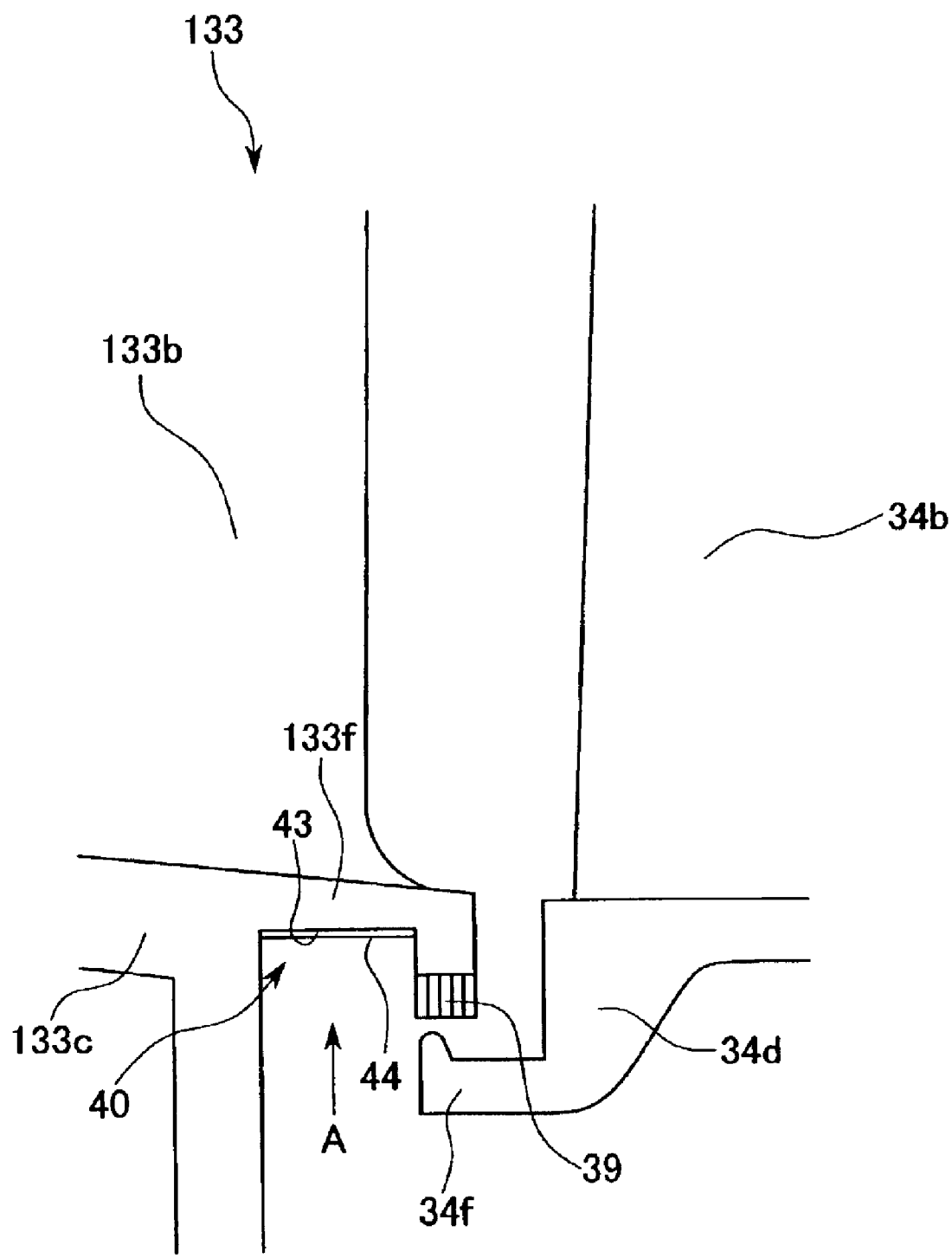
FIG. 2 is a partially enlarged view similar to FIG. 1, which shows a structure having fins in the concave portion.

Additionally, as shown in FIG. 2, a plurality of fins 44 for radiating heat may be provided at the bottom face 43 of the concave portion 40, which protrude towards the rotation shaft R (see FIG. 4) of the moving-blade disks.

According to the above structure, the heat radiation efficiency of the rear-edge vicinity portion 133f is improved, and the thermal stress produced at this portion can be further reduced.

Figure 3:
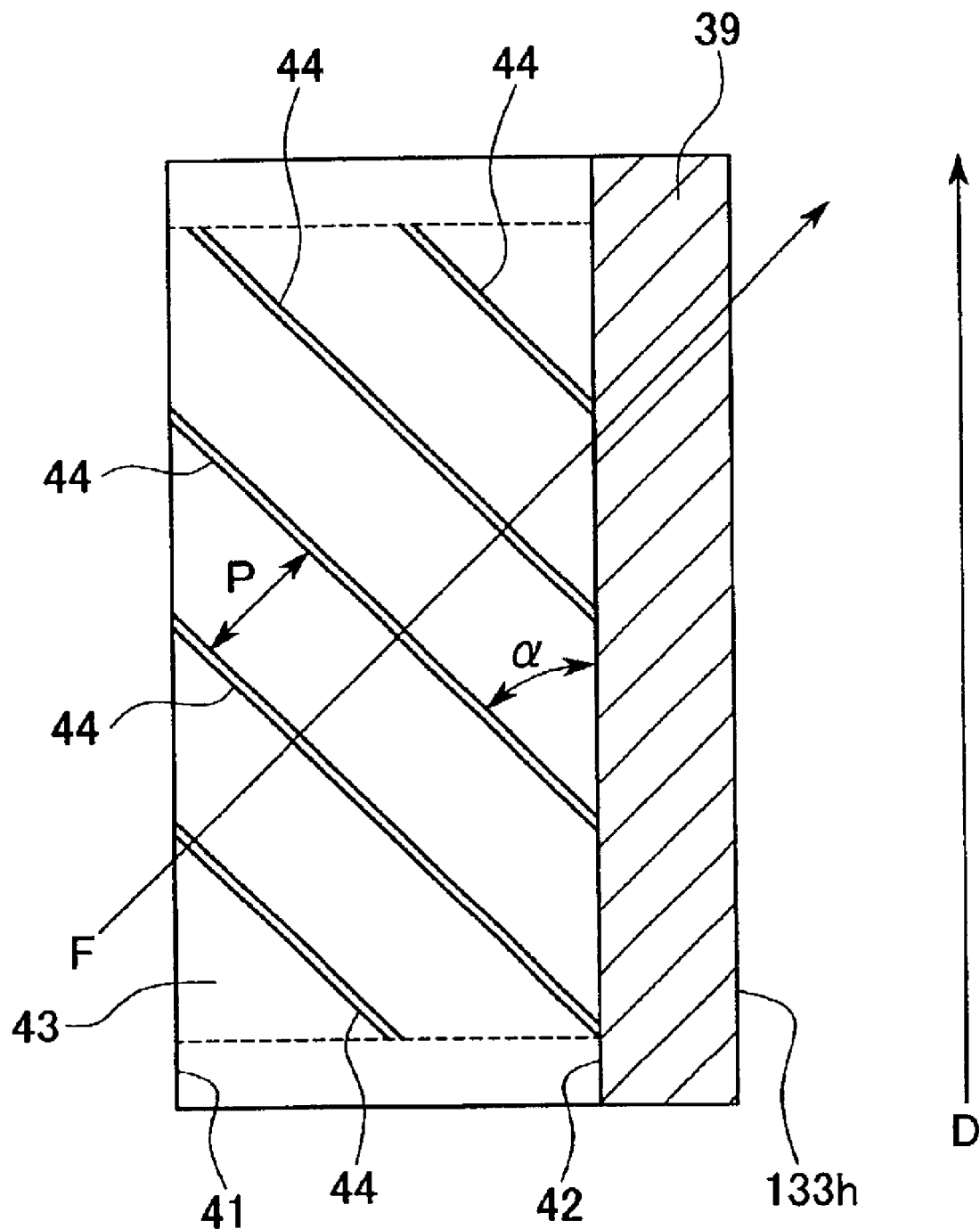
FIG. 3 is a view which shows the bottom face of the concave portion and which is seen from the direction indicated by reference symbol A in FIG. 2.

FIG. 3 is a view which is seen from the direction indicated by reference symbol A in FIG. 2. As shown in FIG. 3, it is effective if the fins 44 for radiating heat are arranged in a manner such that each fin is inclined at angle a with respect to direction D of the rotation of the moving-blade disk, so as to disturb flow F of the cooling air C.

Accordingly, the cooling air C collides with the fins 44 and can remove thermal boundary layers which have been formed above the fins 44. Therefore, heat radiation efficiency of this portion is further improved, thereby further reducing the thermal stress produced at this portion.

As a preferable example, the inclination angle $\alpha$ is 45 degrees, a pitch P of the fins (i.e., distance between adjacent fins) is 10 mm, and the height (of protrusion) of the fins 44 is 1 mm.

The platform 34d of the moving blade has an arm 34f, and the above pitch of 10 mm corresponds to the difference between the length of the arm 34f in a cool state and the length of the arm 34f in a warm state, that is, a difference due to thermal expansion. Therefore, it is more effective if the arm 34f in the cool state is positioned immediately below the rear edge 133h of the rear-edge vicinity portion 133f (see FIG. 1) and the arm 34f in the warm state is positioned immediately below the side wall 42 of the concave portion 40.

As shown in FIGS. 1 to 3, a heat insulating material 39 (e.g., a honeycomb seal made of porous ceramic) may be attached to a part of the inner-peripheral face 133g, where the part is positioned between the concave portion 40 and the rear edge of the inner shroud 133c. Preferably, the heat insulating material 39 has a length of approximately 10 mm in the axial direction. This length of 10 mm corresponds to the above-explained difference between the length of the arm 34f in the cool state and the length of the arm 34f in the warm state, that is, a difference due to thermal expansion.

According to such a heat insulating material 39, it is possible to suppress or reduce the flow of the cooling air C which passes between the inner shroud 133c and the platform 34d and flows to the main body 133b of the stationary blade 133 and the main body 34b of the moving blade 34.

The above-explained concave portion 40 of the inner shroud 133c can be formed by casting, EDM (electric discharge machining), or the like.

In the above-explained embodiment, the second-row stationary blade of the four-row arrangement of stationary and moving blades in the gas turbine has been explained. However, the present invention can also be applied to a stationary blade other than the second-row stationary blade or to a stationary blade of a five- or more row arrangement of stationary and moving blades.

In addition, the direction along which the fins are arranged is not limited to that shown in FIG. 3 (which is employed for disturbing the flow F of the cooling air C), and a direction substantially parallel to the flow F is possible if necessary.

What is claimed is:

1. A stationary blade provided in a gas turbine which comprises moving blades arranged in a plurality of rows and moving-blade disks to which main bodies of the moving blades are attached, wherein:

the stationary blade comprises an outer shroud, a main body, and an inner shroud and is positioned adjacent to at least one of the moving-blade disks in an axial direction of the gas turbine;

the stationary blade introduces a combustion gas into the main body of the moving blade of the next row; and a concave portion is provided in the inner shroud in a manner such that:

the concave portion is formed in the vicinity of a rear edge of the inner shroud and on an inner-peripheral face of the inner shroud, where cooling air passes along the inner-peripheral face which faces a rotation shaft of the moving-blade disks; and a protruding portion which protrudes towards the rotation shaft is formed at the rear edge of the inner shroud, wherein a plurality of fins for radiating heat are arranged on a bottom face of the concave portion, which protrude towards the rotation shaft of the moving-blade disks.

2. A stationary blade as claimed in claim 1, wherein the fins are arranged along a direction which is inclined with respect to the rotation shaft of the moving-blade disks and by which a flow of the cooling air is disturbed.

3. A stationary blade provided in a gas turbine which comprises moving blades arranged in a plurality of rows and moving-blade disks to which main bodies of the moving blades are attached, wherein:

the stationary blade comprises an outer shroud, a main body, and an inner shroud and is positioned adjacent to at least one of the moving-blade disks in an axial direction of the gas turbine;

the stationary blade introduces a combustion gas into the main body of the moving blade of the next row;

a concave portion is provided in the inner shroud in a manner such that:

the concave portion is formed in the vicinity of a rear edge of the inner shroud and on an inner-peripheral face of the inner shroud, where cooling air passes along the inner-peripheral face which faces a rotation shaft of the moving-blade disks; and a protruding portion which protrudes towards the rotation shaft is formed at the rear edge of the inner shroud;

wherein the concave portion has side walls which are continuously formed through the inner-peripheral face in a manner such that the side walls are substantially parallel to a plane of rotation of the moving-blade disks; and wherein a plurality of fins for radiating heat are arranged on a bottom face of the concave portion, which protrude towards the rotation shaft of the moving-blade disks.

4. A stationary blade as claimed in claim 3, wherein the fins are arranged along a direction which is inclined with respect to the rotation shaft of the moving-blade disks and by which a flow of the cooling air is disturbed.

5. A gas turbine comprising:

a turbine portion having a stationary blade as claimed in any one of claims 3 and 4;

a compressor for compressing air for combustion and supplying the compressed air to a combustor; and the combustor for burning the air supplied from the compressor by injecting fuel into the air and for producing a high-temperature combustion gas.

* * * * *